(12) United States Patent
Merklein et al.

(10) Patent No.: US 10,781,922 B2
(45) Date of Patent: Sep. 22, 2020

(54) DEVICE FOR ACTUATING A PARKING LOCK OF AN AUTOMATIC TRANSMISSION, AND PARKING LOCK APPARATUS FOR SUCH AN AUTOMATIC TRANSMISSION

(71) Applicant: AUDI AG, Ingolstadt (DE)

(72) Inventors: Harald Merklein, Wettstetten (DE); Steffen Zäpfel, Kösching (DE)

(73) Assignee: AUDI AG, Ingolstadt (DE)

( * ) Notice: Subject to any disclaimer, the term of this patent is extended or adjusted under 35 U.S.C. 154(b) by 71 days.

(21) Appl. No.: 16/309,237

(22) PCT Filed: Jun. 12, 2017

(86) PCT No.: PCT/EP2017/064257
§ 371 (c)(1),
(2) Date: Dec. 12, 2018

(87) PCT Pub. No.: WO2017/216092
PCT Pub. Date: Dec. 21, 2017

(65) Prior Publication Data
US 2019/0309847 A1 Oct. 10, 2019

(30) Foreign Application Priority Data
Jun. 17, 2016 (DE) .......... 10 2016 210 874

(51) Int. Cl.
*F16H 63/34* (2006.01)
*F15B 11/10* (2006.01)
*F16H 63/48* (2006.01)

(52) U.S. Cl.
CPC .......... *F16H 63/3483* (2013.01); *F15B 11/10* (2013.01); *F16H 63/483* (2013.01);
(Continued)

(58) Field of Classification Search
CPC .............. F16H 63/3483; F16H 63/483; F15B 2211/30505; F15B 2211/20515; F15B 2211/41527; F15B 2211/7052
See application file for complete search history.

(56) References Cited

U.S. PATENT DOCUMENTS

| | | | |
|---|---|---|---|
| 2011/0023647 A1* | 2/2011 | Engel .................. | F16H 61/30 |
| | | | 74/473.11 |
| 2018/0119816 A1* | 5/2018 | Gollmer ................. | F16H 63/48 |

FOREIGN PATENT DOCUMENTS

| | | |
|---|---|---|
| CN | 102678917 A | 9/2012 |
| DE | 101 36 425 B4 | 10/2009 |

(Continued)

OTHER PUBLICATIONS

Chinese Office Action dated Mar. 19, 2020, in connection with corresponding CN Application No. 201780037316.X (8 pgs., including machine-generated English translation).

(Continued)

*Primary Examiner* — Stacey A Fluhart
(74) *Attorney, Agent, or Firm* — Maier & Maier, PLLC (57) ABSTRACT

A device for actuating a parking lock of an automatic transmission for a motor vehicle. A piston, which a hydraulic medium can be applied from a reservoir by a valve apparatus in order to actuate the parking lock by a valve apparatus, which has a first valve and a second valve, which is arranged downstream of the first valve and upstream of the piston in the flow direction of the hydraulic medium from the reservoir to the piston and which has at least one device connection, by way of which the hydraulic medium can be applied to the piston, the second valve having at least two switching states, and a working chamber, which is bounded by the housing element and by the piston and into which the hydraulic medium can be introduced from the reservoir by (Continued)

the valve apparatus in order to apply the hydraulic medium to the piston.

8 Claims, 5 Drawing Sheets

(52) U.S. Cl.
CPC .............. *F15B 2211/20515* (2013.01); *F15B 2211/30505* (2013.01); *F15B 2211/31529* (2013.01); *F15B 2211/41527* (2013.01); *F15B 2211/7052* (2013.01)

(56) References Cited

FOREIGN PATENT DOCUMENTS

| DE | 10 2009 035 348 A1 | 2/2011 | | |
|---|---|---|---|---|
| DE | 102010038078 A1 | * | 4/2012 | ......... F16H 63/3483 |
| DE | 10 2010 043 257 A1 | 5/2012 | | |
| DE | 10 2010 055 859 A1 | 6/2012 | | |
| DE | 10 2011 105 368 A1 | 12/2012 | | |
| DE | 102011105368 A1 | * | 12/2012 | ......... F16H 63/3483 |
| DE | 10 2014 018 123 A1 | 6/2016 | | |

OTHER PUBLICATIONS

Notification of Transmittal of Translation of the International Preliminary Report on Patentability dated Dec. 27, 2018, in connection with corresponding international Application No. PCT/EP2017/064257 (8 pgs.).
Chinese Office Action dated Nov. 20, 2019, in connection with corresponding CN Application No. 201780037316.X (15 pgs., including machine-generated English translation).
Examination Report dated Mar. 2, 2017 of corresponding German application No. 10 2016 210 874.3; 9 pages.
International Search Report dated Aug. 31, 2017 in corresponding International application No. PCT/EP2017/064257; 6 pages.
Written Opinion of the International Search Authority dated Aug. 31, 2017 in corresponding International application No. PCT/EP2017/064257; 12 pages.

* cited by examiner

DEVICE FOR ACTUATING A PARKING LOCK OF AN AUTOMATIC TRANSMISSION, AND PARKING LOCK APPARATUS FOR SUCH AN AUTOMATIC TRANSMISSION

FIELD

The invention relates to a device for actuating a parking lock of an automatic transmission for a motor vehicle, as well as to a parking lock apparatus for an automatic transmission of a motor vehicle.

BACKGROUND

Such a device for actuating a parking lock of an automatic transmission for a motor vehicle, in particular for an automobile, is to be taken as already known from DE 10 2010 043 257 A1, for example. In this case, the device comprises a housing element, which is formed as a cylinder, and a piston, which is movably accommodated in the housing element. Here, the piston can be moved, in particular translationally, relative to the housing element. In order to actuate the parking lock, a hydraulic medium can be applied from a reservoir by means of a valve apparatus, wherein the application of the medium to the piston can be adjusted by means of the valve apparatus. In this case, the valve apparatus comprises a first valve as well as a second valve, which is arranged downstream of the first valve in the flow direction of the hydraulic medium from the reservoir to the piston and upstream of the piston, that is, between the first valve and the piston. The second valve here has at least one device connection, by way of which the hydraulic medium can be applied to the piston. This means that the hydraulic medium can be conveyed from the reservoir to the piston by way of the device connection of the second valve. Furthermore, the second valve has at least two switching states, into which the second valve can be brought and, in particular, moved.

Moreover, the device has a working chamber, which is bounded by the housing element and by the piston, into which the hydraulic medium can be introduced from the reservoir by way of the valve apparatus in order to apply the hydraulic medium to the piston. In other words, the hydraulic medium can be introduced from the reservoir into the working chamber via the device connection of the second valve, in order to apply the hydraulic medium to the piston, as a result of which the piston is actuated. For example, depending on a pressure of the hydraulic medium, the introduction of the hydraulic medium into the working chamber results in a force being exerted on the piston, which can be actuated by means of the force, and, in particular, can be moved relative to the housing element.

Further provided is an actuator, which can be electrically actuated, and by means of which the second valve can be moved and thus brought from a first of the switching states into the second switching state by energizing the actuator. The second valve is thus an electrically actuated valve, which can be actuated by use of electrical current, and, in the present case, can be moved from the first switching state into the second switching state. The energization of the actuator is understood to mean that the actuator is supplied with electrical current so as, in this way, to actuate the second valve by means of the actuator and thereby to bring, that is, to move, the second valve from the first switching state into the second switching state. Furthermore, the device comprises at least one spring element, by means of which the second valve can be moved from the second switching state into the first switching state when the actuator is not energized.

Furthermore, DE 10 2010 055 859 A1 discloses a device for actuating a parking lock of an automatic transmission in motor vehicles, wherein said device has a pawl, which interacts with a ratchet and to which a spring mechanism can be applied in order to engage the parking lock, and to which, in order to disengage the parking lock, a load can be applied by a hydraulic transmission control unit with corresponding control valves, said load hydraulically opposing the pretensioning force of the spring mechanism. In this way, the control valves can be electrically actuated in accordance with operating parameters of the motor vehicle and a selection device. Further provided is a locking element, which can be electromagnetically operated and which, in the actuated state, holds the pawl additionally in the disengaged position in defined operating states of the motor vehicle. It is further provided that a purely hydraulically acting self-hold valve is integrated in the hydraulic transmission control unit and maintains the actuated system pressure when pressure is applied to the parking lock actuation or when the parking lock is disengaged.

Finally, a parking lock device for an automatic or automated motor vehicle transmission, which has at least one locking element and at least one hydraulic cylinder, is known from DE 10 2009 035 348 A1. The hydraulic cylinder and/or the piston thereof is spring-loaded in an actuating direction by means of a spring element, preferably a compression spring, wherein the motor vehicle transmission can be blocked by means of the locking element, and wherein the locking element is coupled to the hydraulic cylinder and/or to the piston in a functionally effective manner, so that, in the pressure-free state of the hydraulic cylinder, the locking element can be engaged and the motor vehicle transmission can be blocked by means of the spring element or by means of the compression spring. When the hydraulic cylinder applies pressure, the locking element can be disengaged, wherein the pressure in the hydraulic cylinder can be regulated via a pressure line equipped with a safety valve. In this way, it is provided that, in the pressure line between the safety valve and the hydraulic cylinder, a gate valve is provided, which is piloted by way of a switching valve.

SUMMARY

The object of the present invention is to further develop a device as well as a parking lock apparatus of the kind mentioned in the introduction in such a way that a simply constructed and redundant locking mechanism can be realized with a small requirement in terms of packing space.

A first aspect of the invention relates to a device for actuating a parking lock of an automatic transmission for a motor vehicle, comprising a piston, which is movably accommodated in a housing element and to which a hydraulic medium can be applied from a reservoir by means of a valve apparatus in order to actuate the parking lock. The housing element is, for example, a cylinder, wherein, for example, the piston is accommodated in the cylinder in a translationally movable manner. Thus, the piston can move relative to the housing element, in particular, in a translational manner.

In this case, the hydraulic medium can be applied to the piston by way of the valve apparatus, so that the application of the hydraulic medium to the piston can be adjusted, that is, controlled or regulated, by means of the valve apparatus.

The valve apparatus here comprises a first valve and a second valve, which is arranged downstream of the first valve and upstream of the piston in the flow direction of the hydraulic medium from the reservoir to the piston. In other words, in relation to the flow direction of the hydraulic medium from the reservoir to the piston, the second valve is arranged between the piston and the first valve. The second valve has at least one device connection, by way of which the hydraulic medium can be applied to the piston. This means that the hydraulic medium can be conveyed to the piston from the reservoir by way of the device connection of the second valve. The second valve further has two switching states, into which the second valve can be brought or moved.

The device further has a working chamber, which is bounded at least partially by the housing element and by the piston and into which the hydraulic medium can be introduced from the reservoir by way of the valve apparatus in order to apply the hydraulic medium to the piston. In other words, the hydraulic medium is introduced from the reservoir into the working chamber by way of the valve apparatus and, in particular, by way of the device connection of the second valve so as, in this way, to apply the hydraulic medium that is introduced into the working chamber to the piston. The piston is thereby actuated, that is, moved relative to the housing element. The hydraulic medium that is introduced into the working chamber exerts—for example, depending on its pressure—a force on the piston, which is actuated by means of the force and is thereby moved relative to the housing element.

The device further comprises an actuator, which can be electrically actuated, and by means of which the second valve can be moved from a first of the switching states into the second switching state by energization of the actuator. The energization of the actuator is understood to mean that the actuator is supplied with electrical current so as, in this way, to actuate the second valve by means of the actuator and thereby to move the second valve from the first switching state into the second switching state, and, in particular, to keep the second valve in the second switching state. The second valve is thus an electrically actuated valve, because the second valve is actuated using electrical current, that is, in particular, can be moved from the first switching state into the second switching state. Furthermore, the actuator is energized, for example, in order to keep the second valve in the second switching state.

The device further comprises at least one spring element, by means of which the second valve can be moved from the second switching state into the first switching state when the actuator is not energized. The unenergized state of the actuator is understood to mean that the actuator is not supplied with electrical current. For example, the spring element is tensioned more strongly in the second switching state of the second valve than in the first switching state, so that, in the second switching state, the spring element provides a spring force that, for example, acts on the second valve. In this case, the second valve is held in the second switching state against the spring force, for example, by supplying the actuator with electrical current, that is, by energizing the actuator.

If the energization of the actuator is terminated, for example, so that the actuator is brought from its energized state into its unenergized state, the spring element can relax, for example, or the second valve is moved from the second switching state into the first switching state by means of the spring force. Preferably, it is provided that the spring element is also still somewhat tensioned in the first switching state, so that, in the first switching state, the spring element also provides a spring force that acts on the second valve, so that the second valve can be kept in the first switching state by means of the spring force.

In accordance with the invention, in order to realize an especially simply constructed and redundant locking mechanism of the device with an especially small requirement in terms of packing space, a control line is then provided, which is fluidically connected to the device connection of the second valve, and by way of which hydraulic medium can be applied to the second valve, so as, in this way, to keep the second valve in the second switching state. By way of the control line, a pressure of the hydraulic medium prevailing at the outlet of the second valve can be applied to the second valve, so that the second valve can be kept in the second switching state by means of the hydraulic medium or by means of the pressure of the hydraulic medium, in particular, when the actuator is without current, that is, when the actuator is not energized. In other words, through the described application of pressure to the second valve via the control line, it is possible to keep the second valve in the second switching state when the actuator is in its unenergized state, so that the valve can be secured against an undesired movement from the second switching state into the first switching state.

In accordance with the invention, it is thus provided that the second valve is not designed solely as an electrically actuated valve, but instead as an electrically and hydraulically actuated valve, so that the second valve can be kept in the second switching state both by means of the actuator and thus by use of electrical current, and also by means of the hydraulic medium and thus hydraulically, and can be secured against an undesired movement from the second switching state into the first switching state. In this way, it is possible to realize a simply constructed and redundant locking mechanism, and, at the same time, the requirement in terms of packing space and the electricity demand of the device according to the invention can be kept especially small. Beyond this, it is possible to realize an at least large freedom to place the device or the locking mechanism in the automatic transmission.

Through the utilization of the control line, it is possible to create a hydraulic locking system or a hydraulic locking mechanism for the piston and thus for the parking lock of the automatic transmission that is preferably designed as a shift-by-wire transmission. In this case, the invention is based, in particular, on the following realization: Conventional automatic transmissions of motor vehicles are equipped, as a rule, with a mechanical parking lock for blocking a driven shaft of the transmission. Usually assigned to the transmission in this case is a selector lever, which is arranged in the passenger compartment of the motor vehicle, and which, for example, can be moved between at least one drive position and at least one park position. The park position is usually also marked by P. If the selector lever is moved into the park position P, so that a parking stage of the transmission is selected, then the parking lock is engaged.

The drive position is usually also marked by D. If the selector lever is moved into the drive position D, then a drive stage of the transmission is engaged. In this drive stage or in other drive stages, which differ from the parking stage and in which the motor vehicle will be capable of rolling, the parking lock is disengaged. Accordingly, if, for example, the selector lever is moved from the park position P into, for example, the drive position marked with D, then the parking lock is disengaged. In automatic transmissions with electric drive stage selection, which are thus designed as shift-bywire transmissions, the parking lock is generally disengaged by a hydraulic cylinder, which rotates a parking lock actuation shaft in one direction. This hydraulic cylinder comprises, for example, the previously described housing element and the previously described piston, which is hydraulically actuated and thus moved in order to rotate the parking lock actuation shaft, for example. Rotating the parking lock actuation shaft moves, for example, a parking lock pawl out of interaction with a corresponding parking lock ratchet that, for example, moves rotationally fixed with the driven shaft. The parking lock is then disengaged. When the parking lock is engaged, the parking lock pawl is moved into interaction, in particular into form-fitting interaction, with the parking lock ratchet, as a result of which the driven shaft is secured against any rotation. In this way, the motor vehicle can be secured against rolling away.

Accordingly, it is provided that the hydraulic medium and thus a pressure are applied to the hydraulic cylinder or to the piston, so as, in this way, to disengage the parking lock. In order that, if failures in the hydraulics should occur, which can lead to a pressure drop in the hydraulic cylinder, no unintended engagement of the parking lock occurs when, for example, the motor vehicle is traveling, additional electromechanical locking systems are usually provided, which, as redundant systems, also prevent the engagement of the parking lock when there is a drop in the hydraulic pressure. Furthermore, it is possible to utilize electromechanical systems that, as redundant systems, lock the hydraulic cylinder that functions as the parking lock disengagement cylinder and thus prevent any disengagement when there is an unintended application of pressure to the parking lock disengagement cylinder, that is, to the hydraulic cylinder.

The conventional electromechanical locking systems thereby have the following drawbacks: The constructions are generally very complicated, because usually claw systems and detent ball systems are utilized. For the case when the parking gear is locked, the conventional locking systems must have large dimensions in order to be able to keep them locked against the hydraulic pressure and, as a result, they have a substantial packing space requirement and electricity demand. Furthermore, the conventional locking systems have to be arranged in the flow of force of the hydraulic cylinder. In this way, the freedom to place them in the transmission is substantially restricted. These problems and drawbacks can be avoided by means of the device according to the invention, because, through the utilization of the control line, a hydraulic locking system can be realized.

In an advantageous embodiment of the invention, in order to be able to secure the device and thus the parking lock against an unintended actuation in an especially advantageous manner, a feed line, which is connected to the device and by way of which the hydraulic medium can be supplied from the device connection to the working chamber, and a check valve, which is arranged in the feed line, are provided, the latter of which opens in the direction of the working chamber and blocks in the direction of the device connection. This means that the check valve allows a flow of the hydraulic medium through the feed line in the direction of the working chamber and thus away from the second valve, because the check valve opens in the direction of the working chamber. However, because the check valve blocks in the direction of the device connection, the check valve prevents any flow of the hydraulic medium through the feed line away from the working chamber in the direction of the device connection, and thus in the direction of the second valve.

In this case, it has been shown to be especially advantageous when the control line is fluidically connected to the feed line at a connection point, which is arranged between the device connection and the check valve in the flow direction of the hydraulic medium. For example, in relation to a flow direction of the hydraulic medium from the device connection to the working chamber, the connection point is thus arranged downstream of the device connection and upstream of the check valve. As a result, the pressure at the device connection of the second valve is maintained and transmitted back onto the second valve via the control line, as a result of which the second valve is hydraulically kept in the second switching state, that is, by the previously described application of pressure by way of the control line, in particular, even when the actuator is in its unenergized state or undesirably comes into its unenergized state. As a result, an especially effective hydraulic locking system can be realized.

Another embodiment is characterized in that a first return line, which, on the one hand, is fluidically connected to the working chamber and, on the other hand, is attached to a second device connection of the second valve, is provided, by way of which the hydraulic medium can be conveyed out of the working chamber to the second valve. Furthermore, a second return line, on the one hand, is fluidically connected to the reservoir and, on the other hand, is attached to a third device connection of the second valve, is provided, by way of which the hydraulic medium can be conveyed from the second valve into the reservoir. Moreover, a third return line, which, on the one hand, is fluidically connected to the reservoir and, on the other hand, is attached to a fourth device connection of the second valve, is provided, by way which the hydraulic medium can be conveyed from the second valve into the reservoir. Furthermore, a connecting line, which, on the one hand, is attached to a fifth device connection of the second valve and, on the other hand, is attached to a sixth device connection of the first valve, is provided. In this way, in a way that is especially favorable in terms of packing space, especially advantageous flow paths for the hydraulic medium can be realized, so that unintended actuations of the device and thus of the parking lock can be prevented in an especially simple way that is favorable in terms of packing space.

The respective feed line, connecting line, and return line is such a line that, in the scope of the invention, is understood to mean an element through which the hydraulic medium can flow and that is intended for conveying or guiding the hydraulic medium. In this case, the line can be a separate line or else a channel designed as a bore, for example, which is integrated, for example, in a corresponding housing, in particular a housing of the valve apparatus.

It has been shown to be especially advantageous when, in the first switching state of the second valve, the connecting line is disconnected from the feed line and from the first return line, wherein, in the first switching state of the second valve, the feed line is fluidically connected to the third return line via the first and fourth device connections, and wherein, in the first switching state of the second valve, the first return line is fluidically connected to the second return line via the second and third device connections. As a result, it is possible to realize a need-based operation of the device, wherein, in particular, undesired actuations of the device and thus of the parking lock can be safely avoided.

It has further been shown to be especially advantageous when, in the second switching state of the second valve, the feed line is fluidically connected to the connecting line via the first and fifth device connections, wherein, in the second switching state of the second valve, the first return line is disconnected from the second and third return lines. As a result, it is possible in a way that is especially favorable in terms of packing space to realize a redundant hydraulic locking mechanism and to keep the number of parts, the weight, and the costs of the device especially small.

Another embodiment is characterized in that a fourth return line, which is attached to a seventh device connection of the first valve and is fluidically connected to the reservoir, and a second return line, which is attached to an eighth device connection of the first valve and is fluidically connected to the reservoir, are provided. As a result, both the conveyance of the hydraulic medium to the working chamber by way of the valve apparatus and the discharge of the hydraulic medium out of the working chamber to the reservoir by way of the valve apparatus can be adjusted in a need-based manner, and, at the same time, unintended or undesired actuations of the device and thus of the parking lock can be prevented.

For example, the second valve is designed as a 5/2-way valve, so that the second valve has, for example, exactly five device connections and exactly two switching states. Alternatively or additionally, it is conceivable that the first valve is designed as a 3/2-way valve, which has exactly three device connections and exactly two switching states.

In an especially advantageous embodiment of the invention, in a first switching state of the first valve, the connecting line is fluidically connected to the fourth return line via the sixth and seventh device connections and is disconnected from the second feed line.

In another advantageous embodiment of the invention, it is provided that, in a second switching state of the first valve, the connecting line is fluidically connected to the second feed line via the sixth and eighth device connections and is disconnected from the fourth return line.

Finally, it has been found to be especially advantageous when the second valve has an intermediate state, which is different from the first switching state and the second switching state of the second valve, and in which a flow of the hydraulic medium from the first device connection, at the same time, to the fourth and fifth device connections is allowed.

A special advantage of the device is also that an idle state with a twofold pressure decoupling can be adjusted. To this end, the first valve and the second valve are each in the first switching state.

A second aspect of the invention relates to a parking lock apparatus for an automatic transmission of a motor vehicle, in particular an automobile, which has at least one parking lock and a device according to the invention by means which the parking lock can be actuated. Here, advantageous embodiments of the first aspect of the invention are to be regarded as advantageous embodiments of the second aspect of the invention, and vice versa.

Further advantages, features, and details of the invention ensue from the following description of a preferred exemplary embodiment as well as on the basis of the drawing. The features and combinations of features mentioned above in the description as well as the features and combinations of features shown below in the description of the figures and/or solely in the figures can be used not only in the respectively given combination, but also in other combinations or alone, without leaving the scope of the invention.

BRIEF DESCRIPTION OF THE DRAWINGS

Shown in the drawing are.

In the figures, identical or functionally identical elements are furnished with the same reference characters.

DETAILED DESCRIPTION

Figure 1:
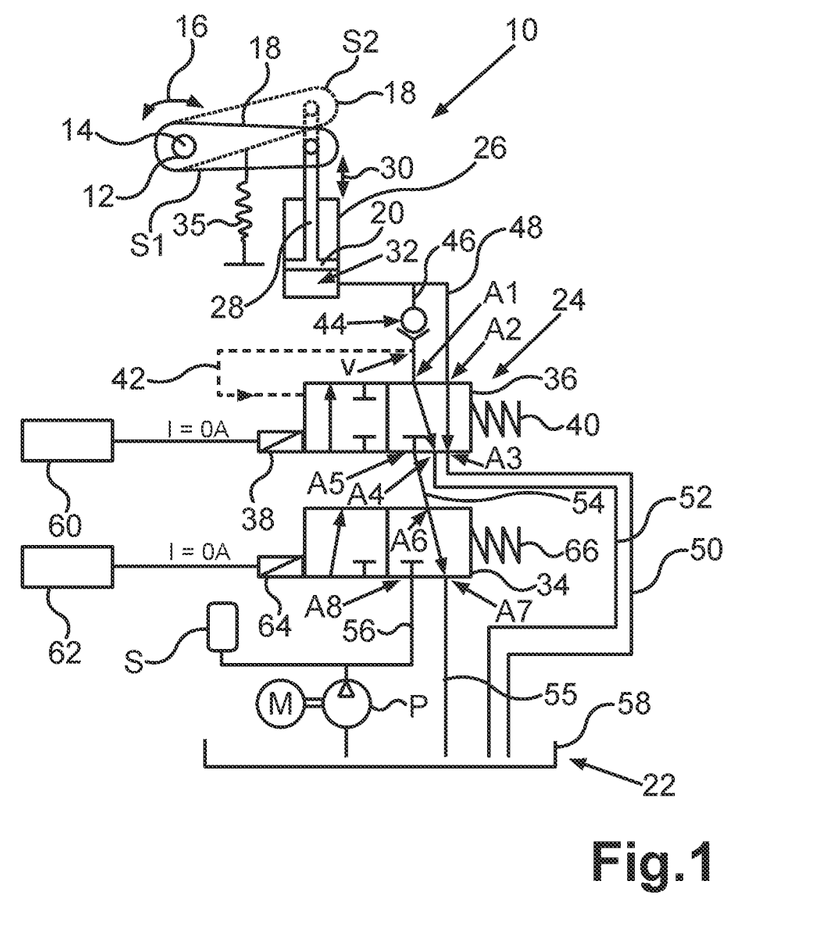
FIG. 1 a schematic illustration of a device according to the invention for actuating a parking lock of an automatic transmission for a motor vehicle, with an idle state of the device being shown in FIG. 1.

FIG. 1 shows a device, identified in its entirety by reference 10, for actuating a parking lock—which is not illustrated in further detail in FIG. 1—of an automatic transmission for a motor vehicle, in particular an automobile. The automatic transmission is an automatic or automated transmission, which has at least one driven shaft, by means of which wheels of the motor vehicle can be driven. The parking lock and the device 10 are component parts of a parking lock apparatus, which has a parking lock ratchet that is in fixed connection with the driven shaft. The parking lock ratchet has, for example, a plurality of teeth, which are successively arranged in the circumferential direction of the parking lock ratchet and between which respective tooth gaps are arranged. Furthermore, the parking lock comprises at least one pawl, which is also referred to as a locking pawl or parking lock pawl. The parking lock or the pawl is coupled, for example, to an actuating shaft 12, so that the pawl can pivot between at least one locking position and at least one release position by rotation of the actuating shaft 12 around an axis of rotation 14. This ability of the actuating shaft 12 to rotate around the axis of rotation 14 is illustrated in FIG. 1 by a double arrow 16. Coupled to the actuating shaft 12 in a rotationally fixed manner is an actuating arm 18, which can pivot around the axis of rotation 14 between at least one first position S1 and at least one second position S2. Pivoting of the actuating arm 18 causes the actuating shaft 12 to rotate around the axis of rotation 14, so that the pawl is pivoted or can be pivoted via the actuating shaft 12 and the actuating arm 18. In this way, the pawl can be pivoted between at least one engaged position and at least one disengaged position by pivoting the actuating arm 18 between the positions S1 and S2.

In this case, the engaged position of the pawl or of the parking lock corresponds to the first position S1, and the disengaged position of the parking lock or of the pawl corresponds to the second position S2. This means that the actuating arm 18 is pivoted from the second position S2 into the first position S1 in order to engage the parking lock. In order to disengage the parking lock, the actuating arm 18 is pivoted from the first position S1 into the second position S2. In the engaged position, the parking lock—in particular, its pawl—interacts with the parking lock ratchet in a form-fitting manner in that, for example, the parking lock—in particular its pawl—engages in one of the tooth gaps. In this way, the parking lock ratchet and, via the latter, the driven shaft are secured against rotation, so that the wheels of the motor vehicle that can be driven by the driven shaft cannot rotate. In this way, the motor vehicle is secured against rolling away undesirably.

In the disengaged position, the parking lock—in particular its pawl—is out of interaction with the parking lock gear. This means that, in the disengaged position, the parking lock—in particular its pawl—engages in none of the tooth gaps, so that the parking lock releases the driven shaft enabling a rotation. In this way, in the disengaged position of the parking lock, the motor vehicle is able to roll.

In this case, the device 10 comprises a piston 20, to which, for actuation of the parking lock, and, in particular, for the disengagement thereof, a hydraulic medium, that is, a liquid, can be applied from a reservoir, identified in its entirety by reference 22, by way of a valve apparatus 24 of the device 10. This means that the device 10 comprises the valve apparatus 24 and, if need be, the reservoir 22.

In this case, the device 10 comprises a cylinder 26, which is formed as a housing element, and in which, the piston 20 can be accommodated movably in a translational manner. This means that the piston 20 can be moved translationally relative to the cylinder 26. The piston 20 is connected here to a piston rod 28, so that the piston rod 28 can move together with the piston 20 relative to the cylinder 26. This ability of the piston 20 and the piston rod 28 to move relative to the cylinder 26 is illustrated in FIG. 1 by a double arrow 30. In order to disengage the parking lock, that is, in order to move the parking lock from its engaged state into its disengaged state, the piston 20 is moved relative to the cylinder 26 in such a way that the piston rod 28 is withdrawn from the cylinder 26. In this way, the actuating arm 18 is moved from the first position S1 into the second position S2.

In order to actuate the piston 20 and, in this way, to disengage the parking lock, the hydraulic medium is applied to the piston 20 from the reservoir 22. To this end—as will be explained below in more detail—the hydraulic medium is introduced into the cylinder 26 and, in particular, into a working chamber 32 of the device 10, which is bounded partially, respectively, by the piston 20 and by the cylinder 26.

In order to disengage the parking lock, that is, in order to move the parking lock from its engaged state into its disengaged state, the hydraulic medium is discharged out of the cylinder 26 and, in particular, out of the working chamber 32. Furthermore, for disengagement of the parking lock, a first spring element is provided, this element being designed as a return spring 35, and which, for example, is coupled to the actuating arm 18, and, in the disengaged state of the parking lock, is tensioned more strongly than in the engaged state. In this way, in the disengaged state, the return spring 35 provides a spring force, which—in the present case, via the actuating arm 18 and the actuating shaft 12—acts on the parking lock. For example, the parking lock is kept in the disengaged state by means of the hydraulic medium introduced into the cylinder 26, and, in particular, into the working chamber 32, against the spring force provided by the return spring 35. If the hydraulic medium is discharged out of the working chamber 32, then the return spring 35 can relax, for example, so that the parking lock can be engaged by means of the return spring 35 or by means of the force provided by the return spring 35. In the present case, this is applicable because, when the hydraulic medium is discharged at least partially out of the working chamber 32, the actuating arm 18 is pivoted from the second position S2 into the first position S1 by means of the spring force of the return spring 35.

The piston 20 and the cylinder 26 form a hydraulic cylinder for actuating the parking lock, with this hydraulic cylinder also being referred to as a parking lock disengagement cylinder (German: Parksperren-Auslegezylinder, PAZ). The valve apparatus 24 comprises a first valve 34, which, in the present case, is designed as a 3/2-way valve and is also referred to as an actuating valve or as a parking lock actuation valve (German: Parksperren-Ansteuerventil, PAV).

The valve apparatus 24 further comprises a second valve 36, which, in the flow direction of the hydraulic medium from the reservoir 22 to the piston 20 or to the working chamber 32, is arranged downstream of the first valve 34 and upstream of the piston 20, in particular of the working chamber 32. This means that, in relation to the flow direction of the hydraulic medium from the reservoir 22 to the working chamber 32, the second valve 36 is arranged between the working chamber 32 and the first valve 34. As will be explained below in greater detail, the second valve 36 is designed as a 5/2-way valve in the exemplary embodiment illustrated in the figures. In this case, the second valve 36 has a first device connection A1, which is an outlet of the second valve 36. By way of the first device connection A1, the hydraulic medium can be applied to the piston 20, because the hydraulic medium can be introduced from the reservoir 22 or—for disengagement of the parking lock—is introduced into the working chamber 32 by way of the first device connection A1.

Figure 2:
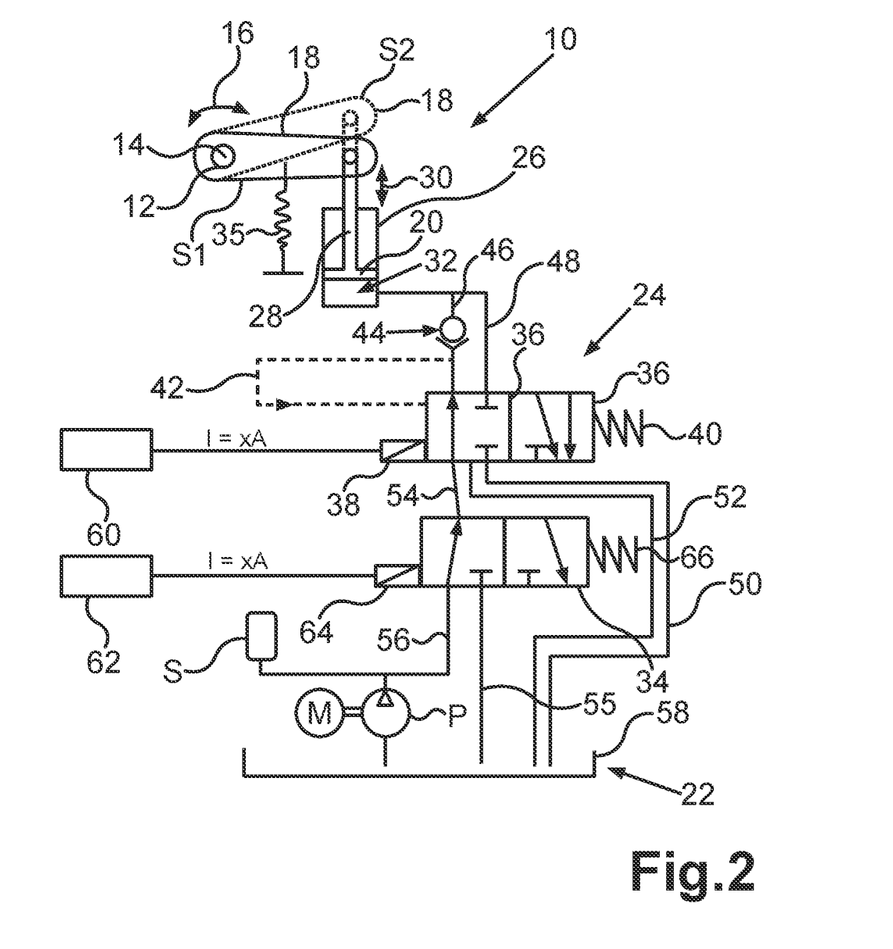
FIG. 2 another schematic illustration of the device, with a normal operation of the device being shown in FIG. 2.

As will be explained below in greater detail, the second valve 36 can be switched between two switching states that differ from each other. In other words, the second valve 36 can move between a first switching state, which is illustrated in FIG. 1, and a second switching state, which is illustrated in FIG. 2. In the present case, the first valve 34 can also move between two switching states that differ from each other, so that the first valve 34 can move between a first switching state of the first valve 34 and a second switching state of the first valve 34. The switching states of the valve 34 are also referred to as a third and a fourth switching state, in order to be able to clearly distinguish the switching states of the valve 34 in terminology from the switching states of the valve 36.

Accordingly, the valve apparatus 24 has four system states. In a first of the system states, the valves 34 and 36 are in their respective first switching state. In a second of the system states, the first valve 34 is in its first switching state and the second valve 36 is in its second switching state. In a third of the system states, the valves 34 and 36 are in their respective second switching state. And in the fourth system state, the valve 34 is in its second switching state and the valve 36 is in its first switching state. In this case, the second valve 36 can be kept hydraulically and/or electrically in the second switching state of the second valve 36.

As already previously indicated, the hydraulic medium can be introduced from the reservoir 22 into the working chamber 32, which is bounded by the cylinder 26 and the piston 20, so as, in this way, to actuate and, in particular, to move the piston 20. Through this actuation or movement of the piston 20, the parking lock—as previously described—can be disengaged.

The valve apparatus 24 further comprises an actuator 38, which is assigned to the second valve 36 and by means of which the second valve 36 can be moved from the first switching state of the second valve 36 into the second switching state of the second valve 36 by energization of the actuator 38. The energization of the actuator 38 is understood to mean that the actuator 38 is supplied with electrical current, with the supplying of the actuator 38 with electrical current also being referred as an actuation of the actuator 38. The actuator 38 is thus an electrically actuated or operated actuator, by means of which the second valve 36 can be actuated or moved, so that the second valve 36 is designed as an electrically actuated valve and in this case can be moved electrically from the first switching state of the second valve 36 into the second switching state of the second valve 36.

The device 10 further comprises a second spring element 40, which is assigned to the second valve 36 and by means of which the second valve 36 can be moved from the second switching state of the second valve 36 into the first switching state of the second valve 36 when the actuator 38 is not energized. For example, in the second switching state of the second valve 36, the spring element 40 is more strongly tensioned than in the first switching state of the second valve 36, so that, at least in the second switching state of the second valve 36, the spring element 40 provides a spring force, by means which the valve 36 can be moved from the second switching state of the second valve 36 into the first switching state of the second valve 36. The valve 36 is moved from the first switching state of the second valve 36 into the second switching state of the second valve 36 against a spring force provided by the spring element 40 by energization of the actuator 38 and is kept in the second switching state of the second valve 36. In this way, for example, the spring element 40 cannot relax when the actuator 38 is energized, that is, when the actuator 38 is supplied with electricity. If the energization of the actuator 38 is terminated, then the spring element 40 can relax, for example, so that the second valve 36 is moved or can be moved from the second switching state of the second valve 36 back into the first switching state of the second valve 36 by means of the spring force provided by the spring element 40 in the second switching state of the second valve 36. For example, the spring element 40 is also still somewhat tensioned in the first switching state of the second valve 36, so that, in the first switching state of the second valve 36, the spring element 40 also provides a spring force, by means which the second valve 36 is kept in the first switching state of the second valve 36. The previously mentioned unenergized state of the actuator 38 is understood to mean that, in the unenergized state, the actuator 38 is not supplied with electrical current. The second valve 36 is also referred to as a stop valve (German: Speerventil, SPV).

In order to realize a simply constructed and redundant locking mechanism of the device 10 with a small requirement in terms of packing space, reduced electricity demand, and at least a large freedom of placement in the transmission, a control line 42 is then provided, which is also referred to as a hydraulic control line (German: hydraulische Steuerleitung, HSL).

The control line 42 is fluidically connected to the device connection A1, so that, by way of the control line 42, the hydraulic medium that is applied at the device connection A1 can be loaded at the second valve 36, which is thereby kept in the second switching state of said second valve 36. In other words, a pressure of the hydraulic medium that has the mentioned pressure at the device connection A1 is applied to the second valve 36 by way of the control line 42, so that the second valve 36 can be kept—and thus hydraulically kept—in the second switching state of the second valve 36 by means of this pressure. Because the second valve 36 can be kept in the second switching position not only by means of the actuator 38 and thus not only by use of electrical current, but also by use of pressure and thus hydraulically, the second valve 36 is designed as a valve that can be actuated electrically and hydraulically.

Furthermore, at the device connection A1, which is designed as an outlet, a check valve 44 (German: Rückschlagventil, RSV) is arranged. In this case, the check valve 44 is arranged in a feed line 46, which is attached to the device connection A1 and by way of which the hydraulic medium can be supplied from the device connection A1 to the working chamber 32. The feed line 46 is thus fluidically connected to the working chamber 32, on the one hand, and to the device connection A1, on the other hand. The check valve 44 here blocks in the direction of the device connection A1 and opens in the direction of the working chamber 32, so that the hydraulic medium can flow through the feed line 46 in the direction of the working chamber 32, but not in the direction of the device connection A1.

In this case, the control line 42 is fluidically connected to the feed line 46 at a connection point V, with the connection point V being arranged between the device connection A1 and the check valve 44 in the flow direction of the hydraulic medium through the feed line 46. In this way, it is possible, for example, when the second valve 36 is in the second switching state of said second valve 36, and when, due to a failure of energization of the actuator 38, the second switching state is terminated, to maintain the pressure of the hydraulic medium in the control line 42, so that the second valve 36 can be kept in the second switching state of said second valve 36 by means of the pressure of the hydraulic medium.

The device 10 further comprises a first return line 48, which, on the one hand, is connected fluidically to the working chamber 32 and, on the other hand, is attached to a second device connection A2 of the second valve 36 and by way of which the hydraulic medium can be conveyed from the working chamber 32 to the second valve 36 and, in particular, to the device connection A2. The device 10 further comprises a second return line 50, which, on the one hand, is fluidically connected to the reservoir 22 and, on the other hand, is attached to a third device connection A3 of the second valve 36 and by way of which the hydraulic medium can be conveyed from the second valve 36 and, in particular, from the device connection A3 into the reservoir 22. Moreover, a third return line 52, which, on the one hand, is fluidically connected to the reservoir 22 and, on the other hand, is attached to a fourth device connection A4 of the second valve 36, is provided, by way of which the hydraulic medium can be conveyed from the second valve 36, and, in particular, from the device connection A4 into the reservoir 22. The device 10 further comprises a connecting line 54, which, on the one hand, is attached to a fifth device connection A5 of the second valve 36 and, on the other hand, is attached to a sixth device connection A6 of the first valve 34, via which the hydraulic medium can flow from the valve 34 to the valve 36, or vice versa.

Moreover, a fourth return line 55, which, on the one hand, is attached to a seventh device connection A7 of the valve 34, and, on the other hand, is connected to the reservoir 22, is provided, by way of which, for example, the hydraulic medium can be conveyed from the valve 34 and, in particular from the device connection A7, into the reservoir 22. The device 10 further comprises a second feed line 56, which, on the one hand, is attached to an eighth device connection A8 of the valve 34 and, on the other hand, is fluidically connected to the reservoir 22. In this case, the reservoir 22 comprises a reservoir tank 58, in which, for example, the hydraulic medium composed of an oil is taken up or stored.

The device 10 further comprises a pump P, which, for example, can be driven by a motor M constructed as an electric motor. Through driving of the pump P, the hydraulic medium is sucked in from the reservoir 22 and, in particular, from the reservoir tank 58, by means of the pump P and pumped to the feed line 56, with the hydraulic medium being pumped through the feed line 56 to the device connection A8 and thus to the valve 34. The reservoir 22 further comprises a storage unit S, which is designed as a pressurized storage unit S, in which the hydraulic medium can be stored under pressure. By means of the pump P, the hydraulic medium can be pumped from the reservoir tank 58 to and, in particular into, the storage unit S, so that the hydraulic medium that is pumped to the storage unit S or into the storage unit S can be stored under pressure. In this way, it is possible, for example, to use at least a part of the hydraulic medium stored under pressure in the storage unit S to disengage the parking lock and to apply the hydraulic medium from the storage unit S to the piston 20.

The device connection A5 is, for example, a pressure inlet of the valve 36, with the device connections A3 and A4 representing connections to the reservoir tank 58. In this case, the check valve 44 is arranged at the device connection A1 and blocks a return flow of the hydraulic medium from the parking lock disengagement cylinder (German: PAZ) into the stop valve (German: SPV). The hydraulic control line 42 (German: HSL) is arranged here between the check valve 44 and the device connection A1, with the control line 42 or the hydraulic medium flowing through the control line 42 or accommodated in the control line 42 moving the valve 36 into the second switching state of said second valve 36 when pressure is applied. In other words, hydraulic medium and—thus a pressure of the hydraulic medium—can be applied via the control line 42 to the second valve 36, which thereby can be moved into the second switching state of said second valve 36 or kept in the second switching state of said second valve 36.

Provided for actuation and thus operation of the actuator 38 is, for example, a first control unit 60, which, for example, is assigned to a so-called selector lever module. The selector lever module comprises the first control unit 60, which is designed as an electronic control unit. The selector lever module further comprises, for example, a selector lever arranged in the passenger compartment of the motor vehicle, by means of which different drive stages of the automatic transmission can be selected and can thereby be engaged. In a first of the drive stages, what is involved is, for example, a parking gear P. In order to engage the parking gear P, the selector lever is moved into its park position, which is also marked by P, as a result of which the parking lock is engaged. In a second of the drive stages, what is involved is a drive stage marked by D, in which the motor vehicle is able to roll. For engagement of the drive stage D, the selector lever is moved, for example, into its drive position, which is also marked as D, so that the parking lock is disengaged.

Further provided, in addition to the control unit 60, is a control unit 62, which differs from control unit 60 and which is, for example, a transmission control unit. In this case, the device 10 comprises a second actuator 64, which is provided in addition to the actuator 38 and is assigned to the valve 34, and which can also be electrically operated or actuated. By means of the actuator 64, the first valve 34 can be moved from its first switching state into its second switching state and, in particular, can be kept in the second switching state of said first valve 34. The first valve 34 can be here moved from the first switching state said first valve 34 into the second switching state of said first valve 34 by means of the actuator 64 by energization of the actuator 64.

The device 10 further comprises a third spring element 66, which is provided in addition to the spring element 40 and is assigned to the valve 34, and by means of which the valve 34 can be moved from the second switching state of said first valve 34 into the first switching state of said first valve 34 when the actuator 64 is not energized. For example, the spring element 66 is tensioned in the second switching state of the first valve 34 more strongly than in the first switching state of said first valve 34, so that, in the second switching state of said first valve 34, the spring element 66 provides a spring force, by means which the valve 34 can be moved from the second switching state of the said valve 34 into the first switching state of said first valve 34. Preferably, the spring element 66 is still somewhat tensioned in the first switching state of said first valve 34, so that, in the first switching state of said first valve 34, the spring element 66 also provides a spring force by means which the valve 34 can be kept in the first switching state of said first valve 34. The valve 34 is moved from the first switching state of said first valve 34 into the second switching state of said first valve 34 against a spring force provided by the spring element 66 by energization of the actuator 64 and is kept in the second switching state of said first valve 34. If the energization of the actuator 64 is terminated, then, for example, the spring element 66 can relax a bit, so that the valve 34 can be moved back out of the second switching state of said first valve 34 into the first switching state of said first valve 34 by means of the spring force provided by the spring element 66. Accordingly, the valve 34 is designed as a valve that can be electrically actuated.

In FIG. 1, it can be seen that the actuator 38 can be actuated by means of the control unit 60, so that the energization of the actuator 38 by means of the control unit 60 can be adjusted. In this way, the valve 36 can be actuated by way of the actuator 38 by means of the control unit 60, that is, for example, can be moved between the first and second switching states of the valve 36. Furthermore, it can be seen from FIG. 1 that the actuator 64 can be actuated by means of the control unit 62, which is designed as an electronic control unit, so that the energization of the actuator 64 can be adjusted by means of the control unit 62. In this way, the first valve 34 can be actuated by way of the actuator 64 by means of the control unit 62, that is, for example, can be moved between the first switching state of the first valve 34 and the second switching state of the first valve 34. In the first switching state of the second valve 36, the second valve 36 (stop valve; German: Sperrventil, SPV) is not actuated and, in this case, is kept in the first switching state of the second valve 36 by means of the spring force provided by the spring element 40.

Because the hydraulic medium is formed, for example, as an oil, the flow of the hydraulic medium is referred to below also as an oil stream or oil flow. In the first switching state of the second valve 36, the oil flow from the valve 34 to the working chamber 32 or to the piston 20 by way of the device connection A5 is blocked and the oil flow from the working chamber 32 to the reservoir tank 58 by way of the device connections A2 and A3 is opened or released. The oil flow from the control line 42 to the reservoir tank 58 by way of the device connections A1 and A4 is also opened or released.

In the second switching state of the second valve 36, the valve 36 is electrically actuated against the spring element 40, which functions as a return spring. The oil flow from the valve 34 to the working chamber 32 by way of the device connections A5 and A1 is opened or released, and the oil flow from the working chamber 32 by way of the device connection A2 via the valve 36 and further into the reservoir tank 58 is blocked.

As a result, a hydraulic locking system can be realized, which can comprise solely a simple valve in the form of the valve 36 with only two switching positions as well as a simple check valve in the form of the check valve 44. Because of the small design size of the valves 34 and 36 and of the check valve 44, the hydraulic locking system necessitates only a small packing space. In this case, the stop valve (SPV) has a very small electricity demand, regardless of the level of an applied pressure and regardless of a locking force that is required. The spatial arrangement of the locking system components "stop valve (SPV)" and "check valve 44 (RSV)" can occur regardless of the arrangement of the parking lock disengagement cylinder (PAZ). Furthermore, the hydraulic locking system makes it possible to lock securely both parking lock states.

Here, FIG. 1 shows an idle state, in which the motor vehicle is without current, for example, and the parking lock is engaged. If, for example, a failure occurs in the transmission control unit (control unit 62), then both valves 34 and 36 are not energized. The respective current with which the respective actuator 38 or 64 is supplied, is identified in FIG. 1 by I. Because, in the present case, neither the actuator 38 nor the actuator 64, and thus neither the valve 36 nor the valve 34, are energized, the respective current I is 0 ampere, so that the following applies: I=0 A (ampere). This idle state is especially advantageous, because a twofold pressure decoupling is realized. A hydraulic overpressure that is present in the pressurized storage unit S is thus redundantly prevented by means of two stop valves, in the form of the valves 34 and 36, from moving the piston 20 in the cylinder 26.

FIG. 2 shows a normal operating state, in which the motor vehicle is energized and the parking lock is disengaged. Both valves 34 and 36 or the actuators 64 and 38 thereof are energized in this case, so that valve 36 is in its second switching state and the valve 34 is in its second switching state. It can be seen from FIGS. 1 and 2 that, in the first switching state of the valve 36, the connecting line 54 is disconnected from the feed line 46 and from the first return line 48, and, in the first switching state of the valve 36, the feed line 46 is fluidically connected to the third return line 52 by way of the first device connection A1 and the fourth device connection A4. Furthermore, in the first switching state of the valve 36, the first return line 48 is fluidically connected to the second return line 50 by way of the second device connection A2 and the third device connection A3.

In the second switching state of the valve 36, the feed line 46 is fluidically connected to the connecting line 54 by way of the first device connection A1 and the fifth device connection A5 and, in the second switching state of the valve 36, the first return line 48 is disconnected from the second return line 50 and from the third return line 54.

In the first switching state of the first valve 34, the connecting line 54 is fluidically connected to the fourth return line 55 by way of the sixth device connection A6 and the seventh device connection A7 and is disconnected from the second feed line 56. In the second switching state of the first valve 34, the connecting line 54 is fluidically connected to the second feed line 56 by way of the sixth device connection A6 and the eighth device connection A8 and is disconnected from the fourth return line 55.

Figure 3:
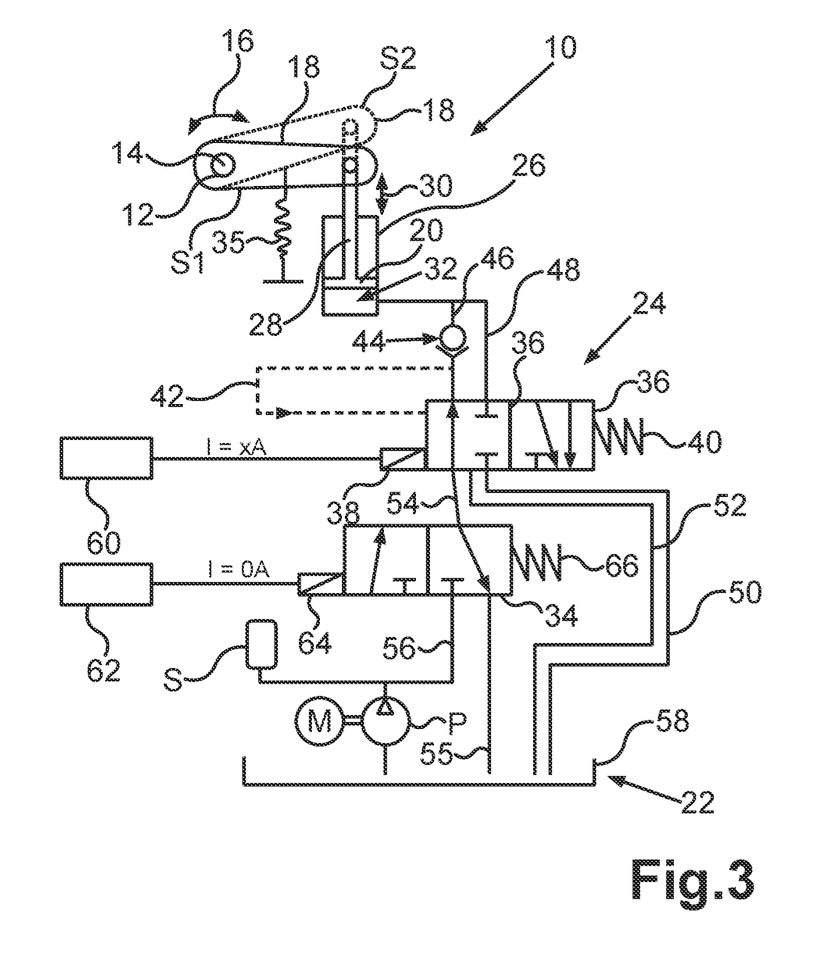
FIG. 3 another schematic illustration of the device, with a first failure state being shown in FIG. 3.

FIG. 3 illustrates a first failure state of the device 10. In this case, the motor vehicle is energized and the parking lock is disengaged. For example, a failure occurs in the control unit 62 (transmission control unit), so that, for example, a failure or loss of energization of the actuator 64 or of the valve 34 ensues. The control line 42 or a path formed by the control line 42, by way of which the hydraulic medium and thus the pressure thereof is applied to the valve 36, is without pressure here, and the valve 36 is kept electrically in the second switching state of said valve 36, that is, by means of the actuator 38 or by energization of the actuator 38. In this case, the engagement of the parking lock is still always possible by switching off the actuator 38 or the valve 36, that is, by terminating the energization of the actuator 38, so that the valve 36 can be moved from the second switching state of said valve 36 into the first switching state of said valve 36 by means of the spring element.

Figure 4:
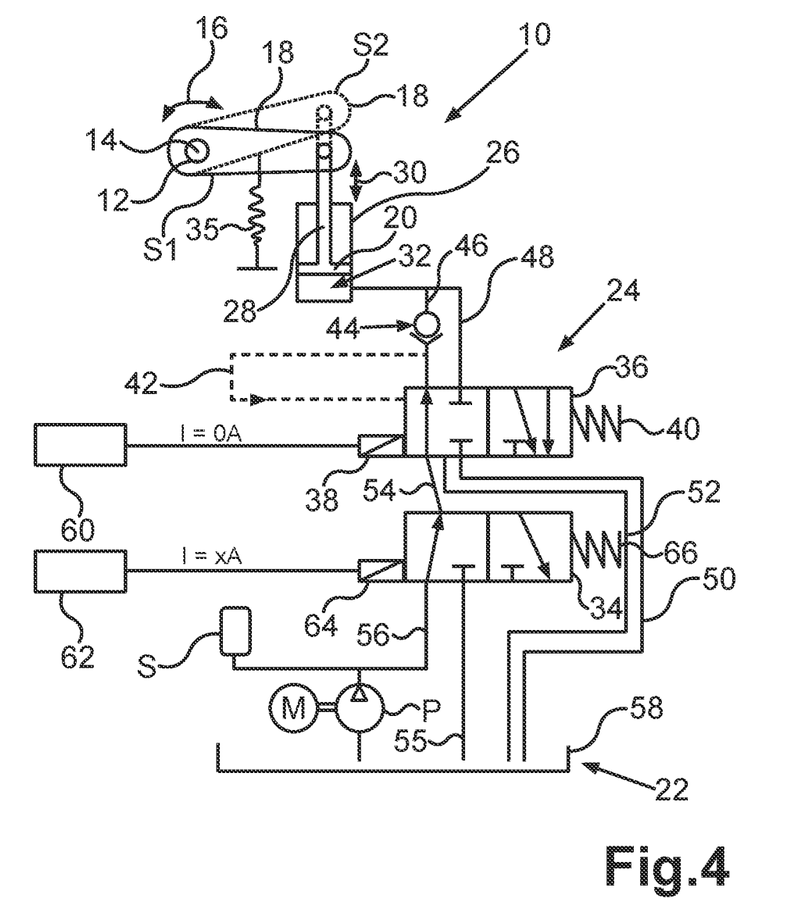
FIG. 4 another schematic illustration of the device, with a second failure state being shown in FIG. 4.

FIG. 4 shows a second failure state of the device 10. In this case, the motor vehicle is energized and the parking lock is disengaged. A failure in the control unit 60 occurs here, so that the actuator 38 or the valve 36 is not energized. In addition, a loss or failure of the electricity supply of the actuator 38 ensues. In this case, pressure is still applied to the control line 42 or to the path formed by the control line 42, so that the valve 36 is kept hydraulically in the second switching state of said valve 36. The valve 34 or the actuator 64 remains energized. In this case, the engagement of the parking lock is still always possible by switching off the actuator 64 or the valve 34, that is, by terminating the energization of the actuator 64, so that, for example, the valve 34 can be moved from the second switching state of the valve 34 into the first switching state of said valve 34 by means of the spring element 66. Accordingly, the control line 42 is without pressure, so that the valve 36 is also opened or is moved from the second switching state into the first switching state.

In a preferred embodiment, it can be provided that the valve 36 is actuated, redundantly or independently of a second or other control unit, such as the valve 34. The actuation of the valve 36 occurs, for example, by a switch actuation control unit (German: Schaltbetätigungs-Steuergerät, SBSG) of a shift-by-wire switch actuation. This is illustrated in FIGS. 1 to 5, because the actuator 64 is actuated by means of the control unit 62 and the actuator 38 is actuated by means of the control unit 60, which is additionally provided and is different from the control unit 62. Preferably, the check valve 44 and the hydraulic control line 42 are integrated in a valve housing of the valve 36 (stop valve SPV). Alternatively or additionally, it can be provided that the stop valve (valve 36), the check valve 44, and the hydraulic control line 42 are integrated in a modular unit with the parking lock disengagement cylinder (PAZ).

Figure 5:
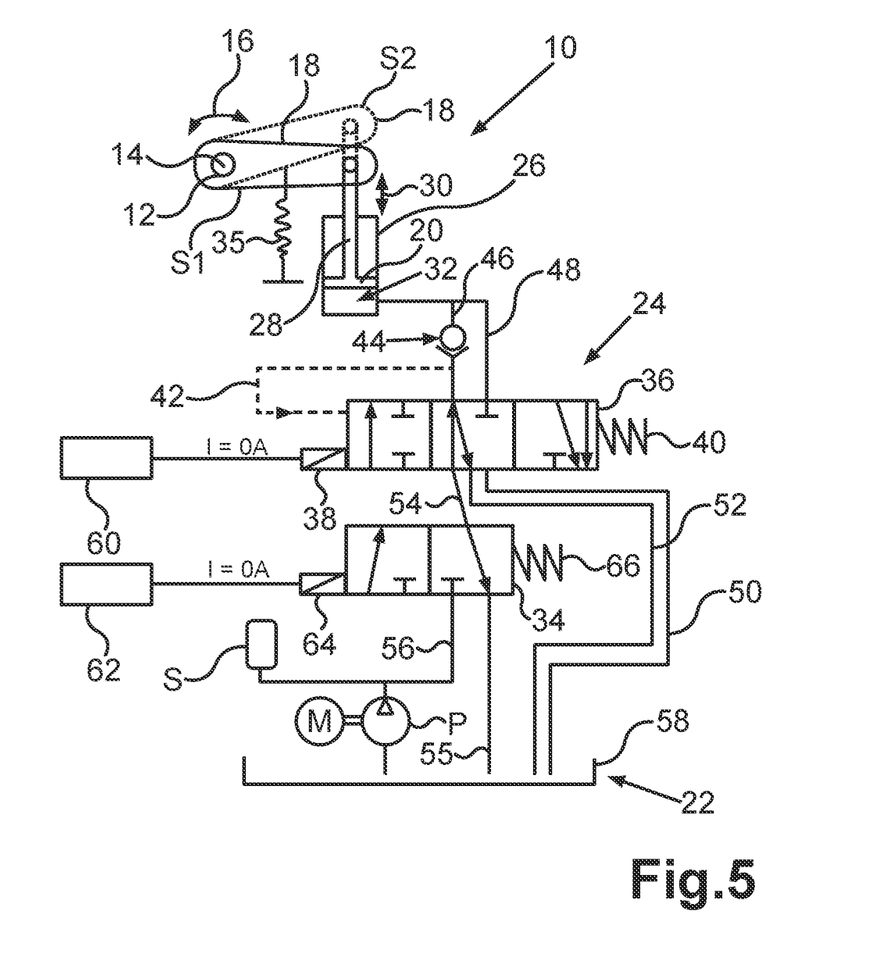
FIG. 5 another schematic illustration of the device, with at least one transitional state of the device being illustrated in FIG. 5.

Alternatively or additionally, for example, for draining the hydraulic control line 42 when the valve 36 is switched off, that is, when the energization of the actuator 38 is terminated, an intermediate state of the valve 36 is provided. The draining of the hydraulic control line 42 is understood to mean that the hydraulic medium initially present in the control line 42, is discharged out of the control line 42. In the intermediate state, an oil flow, that is, a flow of the hydraulic medium from the device connection A1 to the device connections A5 and A4 is adjusted or allowed, at the same time, with it being possible to accomplish this, for example, through a so-called valve overlap of the valve 36, in particular. This intermediate state is also referred to as a transitional state, which is illustrated in FIG. 5. In this transitional state, which is different from the first switching state and the second switching state, the feed line 46 and, by way of this line, the control line 42, for example, are fluidically connected to the device connections A4 and A5 via the device connection A1, so that, for example, hydraulic medium can flow from the control line 42 by way of the device connection A1 and the device connections A4 and A5 to the return lines 52 and 55 and, by way of the latter, into the reservoir 22. In this case it is preferably provided that the intermediate or transitional state is not deliberately actuated, but rather is transited when an alternation occurs between the unactuated and actuated state of the valve 36, that is, when an alternation occurs between the first switching state and the second switching state. In contrast to the intermediate or transitional state illustrated in FIG. 5, an alternative design with opened or allowed oil flow from the device connection A2 to the device connection A3 is possible.

Although the device connections A3 and A4 can in principle be combined into a single device connection, they are designed to be deliberately separate from each other in the present case in order to be able to exclude any retroactive effect of the pressure of the hydraulic medium from the parking lock disengagement cylinder on the hydraulic control line 42. The return lines 50, 52, and/or 55—which, for example, are without pressure—of the respective device connections A3, A4, or A7 may not be required in many applied cases. Normally, it is sufficient that the hydraulic medium can flow out from the respective valve housing directly into the interior of the transmission, where it collects in an oil plan. This oil pan is, for example, the reservoir tank 58. In other words, the return lines 50, 52, and/or 55 can be integrated, for example, in a respective housing of the valve 36 or 34, and, in particular, can be formed as bores.

In another embodiment, it can be provided that the valve 36, the check valve 44, and the hydraulic control line 42 can be arranged in a valve assembly of the transmission or at any desired point in the oil flow between the parking lock actuation valve (first valve 34) and the parking lock disengagement cylinder (PAZ).

Through the transitional state illustrated in FIG. 5, it is possible, for example, to avoid undefined or oscillating transitional states. In this case, any residual volume of the hydraulic medium that is present in the control line 42 should not cause any influence on the switching. The residual volume should be able to be relieved, for example, in a storage chamber or in a tank, such as, for example, in the reservoir tank 58. Pressure should be applied to the control line 42 in such a way that, when the valve 36 is fully switched on, said valve 36 is prevented from closing hydraulically when it is in the transitional state, that is, when there is actually a pressure peak, with the control line 42 being effective only at the very end. Through the separated design of the device connections A3 and A4, it is possible, when switching off occurs, to avoid a pressure-conveying connection of the path formed by the control line 42 to a path formed by the parking lock disengagement cylinder (PAZ), so as to prevent a pressure peak or a recoil onto the path formed by the control line 42.

The invention claimed is:

1. A device for actuating a parking lock of an automatic transmission for a motor vehicle, comprising:
   a piston, which is movably accommodated in a housing element, and to which a hydraulic medium can be applied from a reservoir by a valve apparatus in order to actuate the parking lock, the valve apparatus including a first valve and a second valve, which is arranged downstream of the first valve and upstream of the piston in the flow direction of the hydraulic medium from the reservoir to the piston,
   at least one device connection, by way of which the hydraulic medium can be applied to the piston, the second valve having at least two switching states, and a working chamber, which is bounded by the housing element and by the piston and into which the hydraulic medium can be introduced from the reservoir by the valve apparatus in order to apply the hydraulic medium to the piston,
   an actuator, which can be electrically actuated and by which the second valve can be moved from a first of the switching states into the second switching state by energization of the actuator, and
   at least one spring element, by which the second valve can be moved from the second switching state into the first switching state when the actuator is not energized, wherein a control line, which is fluidically connected to the device connection, is provided, by way of which the hydraulic medium can be applied to the second valve, and in this way is to be held in the second switching state, wherein a feed line, which is attached to the device connection and by way of which the hydraulic medium can be conveyed to the working chamber from the device connection, and a check valve, which is arranged in the feed line, are provided, the check valve opening in the direction of the working chamber and blocking in the direction of the device connection, wherein the control line is fluidically connected to the feed line at a connection point that is arranged between the device connection and the check valve in the flow direction of the hydraulic medium.

2. The device according to claim 1, further comprising:
   a first return line, which, on the one hand, is fluidically connected to the working chamber and, on the other hand, is attached to a second device connection of the second valve, by way of which the hydraulic medium can be conveyed from the working chamber to the second valve;
   a second return line, which, on the one hand, is fluidically connected to the reservoir and, on the other hand, is attached to a third device connection of the second valve, by way of which the hydraulic medium can be conveyed from the second valve into the reservoir;
   a third return line, which, on the one hand, is fluidically connected to the reservoir and, on the other hand, is attached to a fourth device connection of the second valve, by way of which the hydraulic medium can be conveyed from the second valve into the reservoir; and
   a connecting line, which, on the one hand, is attached to a fifth device connection of the second valve and, on the other hand, is attached to a sixth device connection of the first valve.

3. The device according to claim 2, wherein in the first switching state of the second valve, the connecting line is disconnected from the feed line and from the first return line, wherein, in the first switching state of the second valve, the feed line is fluidically connected to the third return line via the first and fourth device connections, and wherein, in the first switching state of the second valve, the first return line is fluidically connected to the second return line by way of the second and third device connections.

4. The device according to claim 3, wherein in the second switching state of the second valve, the feed line is fluidically connected to the connecting line by way of the first and fifth device connections, wherein, in the second switching state of the second valve, the first return line is disconnected from the second and third return lines.

5. The device according to claim 2, wherein a fourth return line, which, on the one hand, is attached to a seventh device connection of the first valve and, on the other hand, is fluidically connected to the reservoir, and a second feed line, which, on the one hand, is attached to an eighth device connection of the first valve and, on the other hand, is fluidically connected to the reservoir, are provided.

6. The device according to claim 5, wherein in a first switching state of the first valve, the connecting line is fluidically connected to the fourth return line by way of the sixth and seventh device connections and is disconnected from the second feed line.

7. The device according to claim 6, wherein in a second switching state of the first valve, the connecting line is fluidically connected to the second feed line by way of the sixth and eighth device connection and is disconnected from the fourth return line.

8. The device according to claim 2, wherein the second valve has an intermediate state, which is different from the first switching state and the second switching state of the second valve, and in which a flow of the hydraulic medium from the first device connection is allowed, at the same time, to the fourth and fifth device connections.

* * * * *